US012333786B2

(12) United States Patent
Li

(10) Patent No.: US 12,333,786 B2
(45) Date of Patent: Jun. 17, 2025

(54) TIME SERIES GENERATOR TRAINED USING SATELLITE DATA

(71) Applicant: Deere & Company, Moline, IL (US)

(72) Inventor: Yueqi Li, San Jose, CA (US)

(73) Assignee: DEERE & COMPANY, Moline, IL (US)

( * ) Notice: Subject to any disclaimer, the term of this patent is extended or adjusted under 35 U.S.C. 154(b) by 351 days.

(21) Appl. No.: 17/969,444

(22) Filed: Oct. 19, 2022

(65) Prior Publication Data

US 2024/0135683 A1 Apr. 25, 2024
US 2024/0233337 A9 Jul. 11, 2024

(51) Int. Cl.
*G06V 20/10* (2022.01)
*G06V 10/764* (2022.01)
*G06V 10/774* (2022.01)
*G06V 10/776* (2022.01)
(Continued)

(52) U.S. Cl.
CPC .......... *G06V 10/774* (2022.01); *G06V 10/764* (2022.01); *G06V 10/776* (2022.01); *G06V 20/13* (2022.01); *G06V 20/188* (2022.01); *G06V 20/70* (2022.01); *G06V 2201/10* (2022.01)

(58) Field of Classification Search
CPC .. G06V 10/774; G06V 10/764; G06V 10/776; G06V 20/13; G06V 20/188; G06V 20/70; G06V 2201/10
See application file for complete search history.

(56) References Cited

U.S. PATENT DOCUMENTS

| 10,909,368 | B2 * | 2/2021 | Guo | G06N 7/01 |
| 11,544,920 | B2 * | 1/2023 | Li | G06V 20/188 |
| 12,045,311 | B2 * | 7/2024 | Olsen | G06T 3/4076 |

(Continued)

OTHER PUBLICATIONS

P. Khandelwal, D. Rammer, S. Pallickara and S. L. Pallickara, "Mind the Gap: Generating Imputations for Satellite Data Collections at Myriad Spatiotemporal Scopes," 2021 IEEE/ACM 21st International Symposium on Cluster, Cloud and Internet Computing (CCGrid), Melbourne, Australia, 2021, pp. 92-102 (Year: 2021).*

(Continued)

*Primary Examiner* — Stephen R Koziol
*Assistant Examiner* — Joshua Chen
(74) *Attorney, Agent, or Firm* — HANLEY, FLIGHT & ZIMMERMAN, LLC

(57) ABSTRACT

Implementations are described herein for utilizing the spectral-, spatial-, and temporal-information of a satellite image time series to facilitate crop control or monitoring. In various implementations, a plurality of training examples may be assembled for a generative model. Each training example of the plurality of training examples may include a respective high-resolution image capturing a respective region and a corresponding low-resolution satellite image time series capturing the respective region. The plurality of training examples can be used to train the generative model, to acquire a trained generative model. A high-resolution image depicting one or more agricultural conditions for a given region, can be received and processed using the trained generative model, to generate a synthetic low-resolution satellite image time series, where the synthetic low-resolution satellite image time series represent the one or more agricultural conditions.

20 Claims, 9 Drawing Sheets

(51) Int. Cl.
*G06V 20/13* (2022.01)
*G06V 20/70* (2022.01)

(56) References Cited

U.S. PATENT DOCUMENTS

| | | | | |
|---|---|---|---|---|
| 2021/0118097 A1* | 4/2021 | Guan | .................. | H04N 1/3871 |
| 2022/0391752 A1* | 12/2022 | Grant | ........................ | G06N 5/04 |
| 2023/0169764 A1* | 6/2023 | Yuan | ..................... | G06T 7/0012 |
| | | | | 382/110 |
| 2024/0362909 A1* | 10/2024 | Melnitchouck | ........ | G06V 10/32 |

OTHER PUBLICATIONS

Khandelwal, Paahuni, et al. "Mind the Gap: Generating imputations for satellite data collections at Myriad spatiotemporal scopes." 2021 IEEE/ACM 21st International Symposium on Cluster, Cloud and Internet Computing (CCGrid). IEEE, 2021. (Year: 2021)*

Bandara et al., "Remote Sensing Change Detection using Denoising Diffusion Probablistic Models" arXiv:2206.11892v2 [cs.CV] 24 pages, dated Jun. 27, 2022.

Zhu et al., "Discrete Contrastive Diffusion for Cross-Modal and Conditional Generation" arXiv:2206.07771v1 [cs.CV] 21 pages, dated Jun. 15, 2022.

Turkoglu et al., "Crop mapping from image time series: deep learning with multi-scale label hierarchies" arXiv:2102.08820v2 [cs.CV] 37 pages, dated Aug. 16, 2021.

Moskolai et al., "Application of Deep Learning Architectures for Satellite Image Time Series Prediction: A Review" Remote Sens. 2021, 13,4822. https://doi.org/10.3390/rs13234822, 30 pages.

Saharia et al., "Photorealistic Text-to-Image Diffusion Models with Deep Language Understanding" arXiv:2205.11487v1 [cs.CV] 46 pages, dated May 23, 2023.

* cited by examiner

TIME SERIES GENERATOR TRAINED USING SATELLITE DATA

BACKGROUND

Satellites, when orbiting Earth (or other planets), can collect and transmit images and/or other data to observe the Earth's surface or atmosphere, using various remote sensing technologies. Satellite images (optical or radar), when collected sequentially in time by a satellite for a given area (which can possibly be anywhere in the world), can form a satellite image time series. Such satellite image time series (i.e., a sequence of satellite images representing a given area over time) not only provides spatial information, but also temporal evolution (e.g., a specific type of crops may have spectral characteristics dependent on the phenological stage of the crops), of the given area. Temporal evolution can be used for various applications that include, but are not limited to: crop classification or monitoring, anomaly detection, detection of tillage practice, deforestation monitoring, land use classification, land cover evolution, weather forecasting, precision agriculture, and climate change. The temporal evolution can be important, for instance, when the resolution of the satellite images in the satellite image time series is too coarse to associate spatial features of parcels of land captured in the satellite images with types of crops within each of the parcels.

Massive amounts of images (and/or other data) are collected daily by the satellites. Given the rich yet complicated information (e.g., millions of pixels, multiple channels including channels other than the traditional RGB channels, the variety of objects, etc.) contained in these images, hand labeling or other pre-processing of these satellite images (individually or in a sequence, which requires the intervention of experts with specialized training in the relevant regions) can be tedious, expensive, and oftentimes unrealistic. As a result, there is a significant shortage of labeled datasets that contain labeled satellite images, much less containing labeled satellite image time series. And when not labeled, a satellite image time series can hardly be used to perform supervised training of machine learning algorithms (e.g., a recurrent neural network, "RNN"), for prediction (e.g., crop yield) or other tasks (e.g., anomaly detection).

SUMMARY

Implementations are described herein for training a generative model to learn distributions between multiple resolutions and/or modalities of ground truth data, particularly agricultural data, and subsequently applying the generative model to generate synthetic data that, in conforming with the learned distributions, is sufficiently realistic for use in training downstream machine learning models, such as discriminative models. More particularly, but not exclusively, implementations are described herein for training the generative model using training data that includes, for example, a high-resolution satellite image capturing a first region and a corresponding low-resolution satellite image time series capturing the same first region, typically at or around the same time period. Here, the training data is unlabeled and is retrieved from a first training database, to train the generative model in a self-supervised manner (e.g., contrastive learning). In some implementations, additional inputs (e.g., "noise" or "metadata") may be included with the training data, such as weather and/or soil conditions of the first region that can be collected automatically from publicly-available sources based on the location and time of the satellite imagery.

The generative model, after being trained, can then be applied to process one modality of data describing a target region, such as a high-resolution satellite image capturing the target region, to effectively "prime" or "condition" the generative model to generate, for instance, a synthetic low-resolution satellite image time series that effectively simulates the target region at the lower resolution. More generally, during training, the generative model learns a distribution between high-resolution (e.g., satellite, ground-based, drone-based, etc.) imagery and low-resolution time series data (e.g., low-resolution satellite imagery). During inference, application of the generative model to high-resolution imagery (in which ground condition(s) are discernable) will predict corresponding synthetic low-resolution time series data (in which those ground conditions may not be discernible). Because the synthetic low-resolution time series data follows the learned distribution, it is sufficiently realistic to be useful as training data for training downstream discriminative models to be used to classify terrain conditions in low resolution imagery in which those terrain conditions would not otherwise be discernible.

In some implementations, the training data to train the generative model can include a plurality of training examples (e.g., "training image pairs" or "training image pairs" plus noise), from the first training database and/or other unlabeled training databases. In some implementations, each training example may include a high-resolution satellite image capturing a particular region (e.g., a particular agricultural field) and a corresponding low-resolution satellite image time series capturing the same particular region. As a non-limiting example, the high-resolution satellite image can be a satellite image acquired by a first satellite (e.g., via a high-resolution sensor having a first resolution of, for instance, approximately 0.5 m/pixel or 1 m/pixel), from the region at time t. In this example, if the region is a grape field, the high-resolution satellite image with the first resolution of approximately 0.5 m/pixel may be capable of showing grapevines in rows or columns within the grape field, which allows a non-expert user to identify a classification label (e.g., a grape field label) for the particular region captured by the high-resolution satellite image.

Continuing with the example above, the corresponding low-resolution satellite image time series capturing the particular region can be acquired by a second satellite, e.g., via a low-resolution sensor having a second resolution that is less than the first resolution, e.g., of approximately 10 m/pixel. The corresponding low-resolution satellite image time series may capture the same particular region at some number of times (which include the time t). Optionally, the second satellite can be the same as, or different from, the first satellite. With a relatively low resolution of approximately 10 m/pixel, the corresponding low-resolution satellite image time series capturing the aforementioned grape field as the first region may not be capable of showing grapevines in rows or columns within the grape field. However, individual pixels (e.g., each representing an area of 10 m×10 m) may have particular values that correspond to conditions on the ground, and these same conditions may be depicted in the high-resolution satellite image.

In some implementations, each training example may include other data (sometimes referred to as "noise") as well. For instance, given that the high-resolution and low-resolution satellite images capture known locations at known times, it is possible to retrieve other relevant data, such as climate or soil data for those locations at those times, from publicly accessible sources (e.g., government databases). This other data may also be processed using the generative model during training as additional context data, along with the high-resolution images and low-resolution time series data. Consequently, the generative model is able to generate more realistic synthetic time series data during inference. For example, a subset of the plurality of training examples that are used to train the generative model can each includes a text describing one or more conditions (e.g., weather conditions, terrain condition, soil conditions including soil type, soil water content, soil brightness, etc.) associated with a particular field (or target field) captured in a respective high-resolution satellite image (alternatively, high-resolution drone image, etc.), in addition to the high-resolution satellite image itself and in addition to the low-resolution satellite image time series that correspond to the high-resolution satellite image.

In some implementations, the generative model can be trained using techniques such as contrastive learning and the aforementioned plurality of training examples until an optimizer goal is reached. In some implementations, the generative model, after being trained, can be used to process, as input, a high-resolution image. The high-resolution image can be collected by a satellite or from other sources (e.g., an unmanned aerial vehicle, "UAV", or a ground robot) for a target field at a particular time $t_p$. In these implementations, the trained generative model can be used to process the received high-resolution image for the target field to generate, as output, a synthetic low-resolution satellite image time series for the target field. Here, the synthetic low-resolution satellite image time series for the target field may include a synthetic low-resolution satellite image, to which the particular time $t_p$ corresponds.

In various implementations, the synthetic low-resolution satellite image time series for the target field can be subsequently processed using a trained discriminative model for tasks such as crop yield prediction, crop type classification, or evolution determination. In various implementations, the trained discriminative model processes, as input, the synthetic low-resolution satellite image time series for a target field, to generate a prediction output or a classification output. The trained discriminative model can be any applicable discriminative model already trained and made available.

Alternatively, in various implementations, the synthetic low-resolution satellite image time series for the target field can be used to generate a training instance. The training instance may include a label determined or ascertained from the high-resolution image based from which the synthetic low-resolution satellite image time series is generated. Such training instances can be stored in a second training database, to train an untrained discriminative model in a supervised manner. By generating the label for the synthetic low-resolution satellite image time series from the high-resolution image (instead of labeling real low-resolution satellite image time series), time and labor resources can be saved because labeling the high-resolution image requires much less expertise knowledge and effort (and can be performed by a non-expert user, or even by a trained classification model) than labeling a sequence of low-resolution satellite images. In this way, a plurality of training instances can be generated and stored in the second training database, where each training instance includes: (i) a synthetic low-resolution satellite image time series, generated by using the trained generative model to process a corresponding high-resolution image (and/or "noise", such as weather or soil conditions associated with the corresponding high-resolution image), and (ii) a label for the synthetic low-resolution satellite image time series, generated from the corresponding high-resolution image. It's noted that by training the generative model using low-resolution satellite image time series conditions on different data (a high-resolution image, a high-resolution image with one or more corresponding soil conditions, a high-resolution image with one or more weather conditions, a high-resolution image with weather and soil conditions, etc.), a variety of synthetic low-resolution satellite image time series can be generated to form a variety of training instances.

In various implementations, an untrained discriminative (e.g., classification) model can be trained using the plurality of training instances, generated as described above. For example, each of a plurality of training instances may include: (1) synthetic low-resolution satellite image time series (e.g., satellite image 1, . . . , satellite image p, . . . , satellite image n) for a respective target field, to which the time series (e.g., $t_1$, . . . , $t_p$, . . . $t_n$) correspond, and (2) label(s) (e.g., indicating a ground truth condition of the target field at a particular time $t_p$, where p is a positive integer and where 1≤p≤n) that is known/generated from the aforementioned high-resolution image that captures the target field, to which the particular time $t_p$ corresponds. In this case, the discriminative model, when under training, is used to process, as input, the synthetic low-resolution satellite image time series for the target field to which the time series (e.g., $t_1$, $t_2$, . . . $t_p$, . . . $t_n$) correspond. By using the discriminative model to process the synthetic low-resolution satellite image time series (e.g., $t_1$, $t_2$, . . . $t_p$, . . . $t_n$) for the target field, an output may be generated that includes, for instance, classification(s) for the target field at $t_p$. The generated output (e.g., classification(s) for the target field at $t_p$) can be compared with the label(s) (i.e., ground truth classification label(s) for the target field at $t_p$) to update one or more weights for the discriminative model (here, a classification model).

Optionally, in some implementations, if the generative model has been trained on the aforementioned subset, of the plurality of training examples, within which each training example includes a high-resolution image (be it satellite image, drone image, street-view image), a low-resolution image time series associated (e.g., time and location) with the high-resolution image and a text describing one or more conditions (soil/terrain/weather conditions, etc.) associated with the high-resolution image, the trained generative model can be used to process a high-resolution image and a text describing metadata, such as a condition (e.g., a soil condition), associated with the high-resolution image, as input. In these implementations, the trained generative model may be used to process the high-resolution image and the text, to output a corresponding synthetic low-resolution satellite image time series. By varying the text to describe different "noises" such as different soil types, terrain, weather conditions, a variety of synthetic low-resolution satellite image time series can be generated by the trained generative model. By varying the type and resolution of the high-resolution image (e.g., high-resolution satellite image, high-resolution street-view image, high-resolution drone images), an additional variety of synthetic low-resolution satellite image time series can be generated by the trained generative model. Accordingly, the variety of training instances can be enhanced, where each training instance includes a respectively generated synthetic low-resolution satellite image time series.

In some implementations, the generative model can include an encoder portion, a diffusion model, and a decoder portion, where the diffusion model refers to a directed graphical model, parameterized by a Markov chain and trained to extract feature representations (e.g., semantics) of input image(s) and/or text(s), to generate synthetic image(s) that are close to real image(s). The encoder portion can be pre-trained to process a high-resolution image to extract features (e.g., distinguishable features) from the high-resolution image, to generate an embedding (may also be referred to as a "feature vector" or "representation", etc.) for the high-resolution image in a latent space. The encoder portion can be fixed ("freeze") when the diffusion model is being trained using contrastive learning. The diffusion model, after being trained, can slowly add random noise to the generated embedding at a plurality of diffusion time steps during a forward diffusion stage, and then removes, during a reverse diffusion stage ("denoising stage"), the random noise added during the forward diffusion stage, to acquire a synthetic embedding. The decoder portion can, based on the synthetic embedding, reconstruct synthetic low-resolution satellite image time series.

Optionally or additionally, the encoder portion can be pre-trained to process a text (e.g., description of soil type), along with a high-resolution satellite image, to generate a text representation (may also be referred to as "text embedding") for the text in a latent space and to generate an image representation for the high-resolution satellite image in the same latent space, and the decoder portion can, after the trained diffusion model performs diffusion to generate a synthetic embedding, reconstruct the synthetic low-resolution satellite image time series using synthetic embedding in the latent space.

In some implementations, the generative model can include a transformer model, where the transformer model refers to a self-attention model that at least includes one or more self-attention network layers, without utilizing any recurrent or convolutional layers. For instance, the transformer model here, after being trained, can receive a high-resolution satellite image that is divided into a plurality of image patches, along with a plurality of positional embeddings ("positional encoding") that indicates a position for a respective image patch, of the plurality of image patches, in the high-resolution satellite image. In this case, the transformer model can include a transformer encoder that processes each image patch along with its corresponding positional embedding, to generate an image representation of the high-resolution satellite image, and include a decoder that generates a synthetic satellite image time series based on the generated image representation. It's noted that the generative model is not limited to being a transformation model or a diffusion model as described above.

The above description is provided as an overview of only some implementations disclosed herein for the sake of example. Those implementations, and other implementations, are described in additional detail hereinbelow.

DETAILED DESCRIPTION

The following description with reference to the accompanying drawings is provided for understanding of various implementations of the present disclosure. It's appreciated that different features from different embodiments may be combined with and/or exchanged for one another. In addition, those of ordinary skill in the art will recognize that various changes and modifications of the various embodiments described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor(s) to enable a clear and consistent understanding of the present disclosure. Accordingly, it should be apparent to those skilled in the art that the following description of various embodiments of the present disclosure is provided for the purpose of illustration only and not for the purpose of limiting the present disclosure as defined by the appended claims and their equivalents.

In various implementations, systems and methods are provided for training a generative model in a self-supervised manner (e.g., contrastive learning) using satellite data (e.g., satellite imagery). The generative model, after being trained, can process a high-resolution image (e.g., a high-resolution satellite image) capturing a particular geographic location (e.g., a crop field) to generate a synthetic satellite image time series (i.e., a sequence of synthesized images for the particular geographic location that simulate satellite images consecutively captured by a satellite for the particular geographic location).

Optionally or additionally, in some implementations, the synthetic satellite image time series (generated by the trained generative model) for the particular geographic location can be processed using a trained discriminative model for determining one or more characteristics (e.g., classification, predicted crop yield) of the particular geographic location.

Optionally or additionally, in some other implementations, a label can be determined from the aforementioned high-resolution image (or a different high-resolution image), where a training instance can be generated to include: (i) the synthetic satellite image time series generated base on the high-resolution image (or the different high-resolution image), as a training input, and (ii) the determined label, as a ground-truth label. The generated training instance can be applied to train an untrained discriminative model in a supervised manner. Detailed descriptions of these above-described implementations, and additional implementations, can be found below, with reference to the accompanying drawings.

Figure 1:
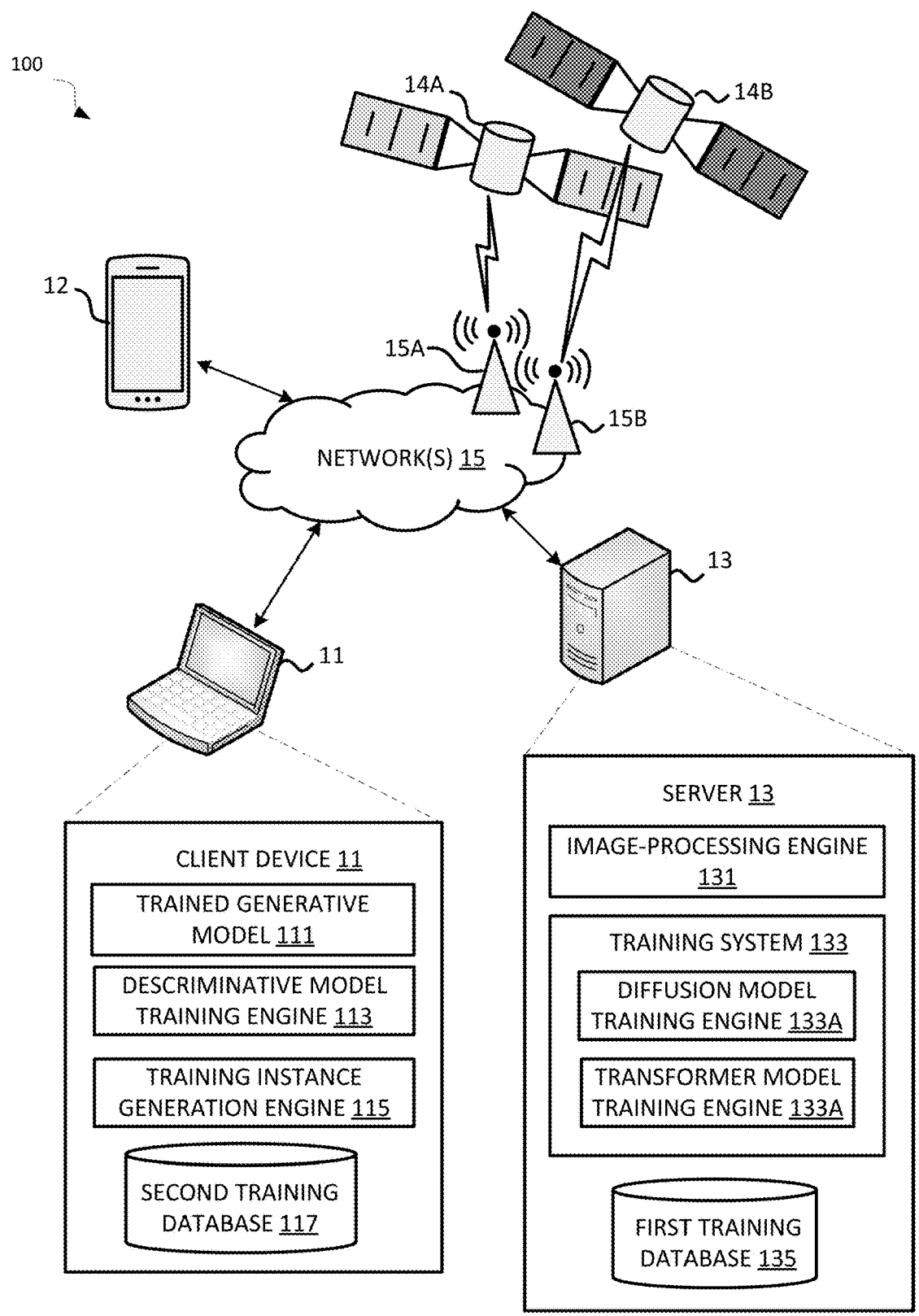
FIG. 1 is a block diagram of an example computing environment in which implementations disclosed herein may be implemented.

FIG. 1 illustrates an example computing environment in which implementations disclosed herein may be implemented. While the example environment 100 is described with reference to satellite imagery, it should be noted that the present disclosure is not intended to be limited thereto, and may be applied to other types of images. As shown in FIG. 1, the example environment 100 includes a plurality of computing devices (e.g., client devices 11 and 12, and a server 13), one or more satellites (e.g., satellite 14A and/or 14B, among the numerous satellites orbiting the Earth), and one or more satellite base stations (15A and/or 15B). The satellite 14A, or the satellite 14B, for instance, can be a Sentinel-2 satellite carrying a sensor having a coarser spatial resolution (e.g., 10 m per pixel) than common agricultural textural elements, such as furrows or crop rows. The plurality of computing devices can communicate with each other via one or more networks 15, where the one or more networks 15 can include, for example, one or more wired or wireless local area networks ("LANs," including Wi-Fi LANs, mesh networks, Bluetooth, near-field communication, etc.), wide area networks ("WANs", including the Internet, cellular data network), or a combination thereof.

In some implementations, satellite 14A (or satellite 14B) carries one or more sensors to detect various wavelengths along an electromagnetic spectrum that includes visible wavelengths (RGB). For instance, the one or more sensors can be configured to capture optical images, such as visible images, near infrared images, or thermal infrared images, of the aforementioned particular geographic location. Given the possible/frequent presence of clouds captured in those optical images, the one or more sensors can, alternatively or additionally, include sensor(s) configured to capture radar images which are not affected by cloudy weather or the image-capturing time (e.g., night), since microwaves could pass through clouds between the satellite(s) carrying the one or more sensors and the particular geographic location.

Image data (e.g., optical or radar images), when collected by the satellite 14A (or other satellites like the satellite 14B), is often stored in a raster format and can be relayed, for instance, to satellite base station 15A (or satellite base station 15B) via a data link established for communications between the satellite 14A and the satellite base station 14A. Due to a short revisiting time (e.g., 3 or 5 days) of satellite(s) such as the satellite 14A above a particular geographic location (which could be any area on Earth or other planet), image data for the particular geographic location may be acquired on a routine basis (e.g., twice per week) and can be collected as one or more satellite image time series for the particular geographic location. The image data (e.g., the one or more satellite image time series) for the particular geographic location (and/or for other geographic locations) received at the satellite base station 15A may be processed, for instance, using the server 13, where the server 13 can be, for example, a web server, a proxy server, a VPN server, or any other type of server as needed and supports the training and deployment of one or more neural networks (e.g., a generative model, classification model, prediction model, etc.).

In various implementations, the server 13 can include an image-processing engine 131, a generative model training system 133, and a first training database 135. The image-processing engine 131 can receive, and optionally process (e.g., by reducing the number of channels in a satellite image or by dividing a satellite image into smaller patches), satellite images from the satellite base stations 15A and 15B (and/or other sources). The image-processing engine 131 can further select a plurality of high-resolution satellite images (alternatively, high-resolution drone images, etc.) and a corresponding low-resolution satellite image time series for each of the plurality of high-resolution satellite images, from the received satellite data, for storage in the first training database 135. For instance, the image-processing engine 131 can generate a plurality of training pairs (also refers to as "training examples") that each includes (i) a high-resolution satellite image captured by a high-resolution sensor of the satellite 14A for a particular region at a particular time, and (ii) a corresponding low-resolution satellite image time series captured by a low-resolution sensor of the satellite 14B for the same particular region at a series of times, where the particular time is within the series of times. The generated plurality of training examples can be stored in the first training database 135 as unlabeled training data to train an untrained generative model in a self-supervised manner.

Alternatively, the image-processing engine 131 can generate a plurality of training examples that each includes (i) a high-resolution non-satellite image captured by a high-resolution sensor (a street-view sensor, a drone sensor, etc.) for a particular region at a particular time, and (ii) a corresponding low-resolution satellite image time series captured by a low-resolution sensor of the satellite for the same particular region at a series of times, where the particular time is within the series of times. Alternatively, the image-processing engine 131 can generate a plurality of training examples that each includes (i) a high-resolution image (satellite or non-satellite) captured by a high-resolution sensor for a particular region at a particular time, (ii) a corresponding low-resolution satellite image time series captured by a low-resolution sensor of the satellite for the same particular region at a series of times, and (iii) soil or weather condition for the particular region at the particular time, where the particular time is within the series of times. The plurality of training examples generated using the aforementioned approaches can be stored in the first training database 135 as unlabeled training data, to train an untrained generative model in a self-supervised manner, using the generative model training system 133.

The generative model training system 133 can, for instance, include a diffusion model training engine 133A, a transformer model training engine 133B, and other training engines (not shown). When the untrained generative model is or includes a diffusion model, the diffusion model training engine 133A can train the diffusion model using the plurality of training examples stored in the first training database 135. For example, the diffusion model can include a diffusion encoder configured to extract image features from a satellite image, by encoding the extracted image features into an image embedding. In this example, the diffusion model training engine 133A can train the diffusion model, using the plurality of training examples, via self-supervised contrastive learning, until an optimizer goal is reached. After being trained, the diffusion encoder can process a high-resolution satellite image (and/or a text describing a condition associated with a field captured in the high-resolution satellite image), to generate an embedding/vector that includes the extracted features of the high-resolution satellite image. The diffusion model can include a diffusion decoder to reconstruct synthetic low-resolution satellite image time series based on the generated embedding/vector. When the untrained generative model is a transformer model, the transformer model training engine 133B can train the transformer model using the plurality of training examples stored in the first training database 135.

In various implementations, the client device 11 or 12 can be, for example, a cell phone, a camera, a computer (e.g., laptop, desktop, notebook), a tablet, a smart appliance, robot having one or more sensors, a wearable device (e.g., glasses), a virtual reality (VR) device, or an augmented reality (AV) device, and the present disclosure is not limited thereto. For instance, the client device 12 can be a client computing device that supports the training and deployment of one or more neural networks (e.g., the aforementioned generative model or discriminative model, etc.).

In various implementations, the client device 11 or 12 can include or otherwise access a trained generative model 111, a discriminative model training engine 113, a training instance generation engine 115, and a second training database 117. The trained generative model 111 can be acquired (and then be stored at the client device 11) by training the aforementioned diffusion model (or transformer model) using the plurality of training examples stored in the first training database 135. The training instance generation engine 115 can access the first training database 135 to retrieve a plurality of high-resolution satellite images (or a plurality of high-resolution non-satellite images) and receive a label for a respective high-resolution satellite image, of the plurality of high-resolution satellite images, via user input (e.g., input from a non-expert user). The training instance generation engine 115 can transmit each of the plurality of high-resolution satellite images to the trained generative model 111, for the trained generative model 111 to process a respective high-resolution satellite image, of the plurality of high-resolution satellite images, thereby generating a corresponding synthetic low-resolution satellite image time series. The training instance generation engine 115 can generate a plurality of training instances, each including (i) a label for a respective high-resolution satellite image from the first training database 135, as ground-truth label; (ii) corresponding synthetic low-resolution satellite image time series, as training input for an untrained discriminative model. The plurality of training instances can be stored in the second training database 117 to train the untrained discriminative model.

The discriminative model training engine 113 can train the discriminative model by processing a synthetic low-resolution satellite image time series from the second training database 117, to generate an output (e.g., a predicted type of a field depicted in the synthetic low-resolution satellite image time series), and determining a difference between the output and a corresponding label (a classification label indicating that the field is an orchard, instead of desert, forest, or building, etc.) created based on a specific planting pattern visually identifiable by a non-expert from the corresponding high-resolution satellite image. Based on the difference between the output and the label, the discriminative model training engine 113 can modify one or more weights of the discriminative model. It's noted that while FIG. 1 is illustrated to show that the client device 11 includes the trained generative model 111, the discriminative model training engine 113, the training instance generation engine 115, and the second training database 117, one or more of these components (e.g., the trained generative model 111, etc.) can be included or stored at the server 13. Similarly, while the server 13 is illustrated in FIG. 1 to include the image-processing engine 131, the training system 133, and the first training database 135, one or more of these components can be included or stored at the client device 11.

Figure 2A:
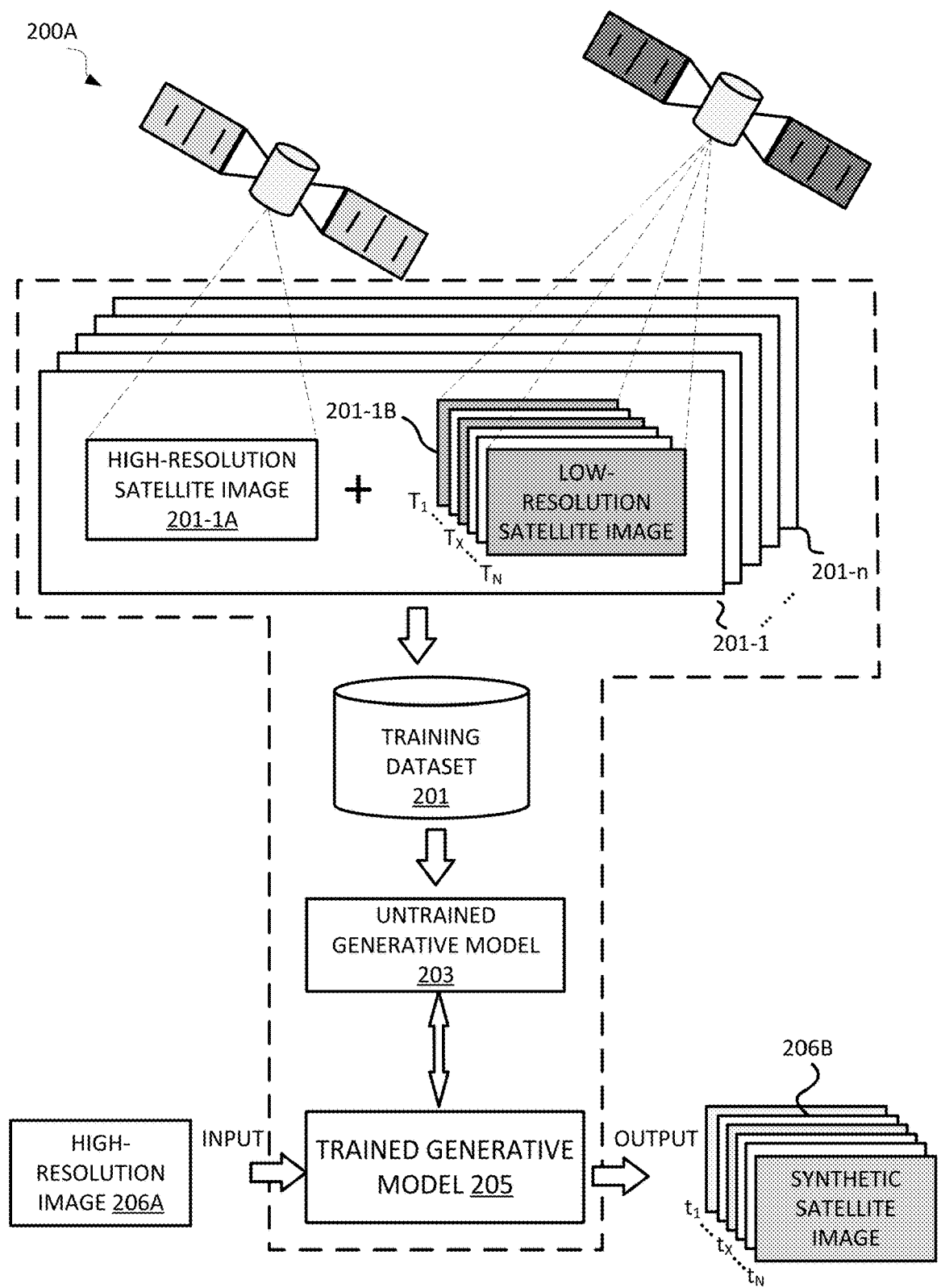
FIG. 2A illustrates an example of training and deployment of a generative model, for practicing certain aspects of the present disclosure, in accordance with various implementations.

FIG. 2A illustrates an example of training a generative and deploying the trained generative model, for practicing certain aspects of the present disclosure, in accordance with various implementations. As shown in FIG. 2A, a training dataset 201 can include a plurality of training examples (sometimes also referred to as "training pairs" or "training image pairs"), e.g., a total number of n training examples 201-1~201-n. The plurality of training examples can include, for instance, a first training example 201-1, where the first training example 201-1 can include: (1) a high-resolution satellite image 201-1A capturing a particular region (e.g., a grape field); and (2) a corresponding low-resolution satellite image time series 201-1B capturing the same particular region. Similarly, each of the rest training examples, e.g., 201-n, can include: (1) a high-resolution satellite image 201-nA capturing the particular region; and (2) a corresponding low-resolution satellite image time series 201-nB capturing the same particular region.

As a non-limiting example, in some implementations, the high-resolution satellite image 201-1A (similarly, 201-nA) can be acquired by a first satellite (e.g., the satellite 14A via a first sensor having a resolution of approximately 0.5 m/pixel), for the particular region at time T (e.g., Jul. 2, 2016, 4 pm EST). The corresponding low-resolution satellite image time series 201-1B (similarly, 201-nB) capturing the same particular region can be acquired by a second satellite (e.g., the satellite 14B via a second sensor having a lower resolution than that of the first sensor, where the lower resolution can be approximately 10 m/pixel), for the particular region, at consecutive times $T_1$, $T_2$, . . . , $T_N$, respectively. In this non-limiting example, T is to fall within $T_1$ and $T_N$ (i. e., $T_1<T<T_N$), or can be the same as one of the consecutive times $T_1$, $T_2$, . . . , $T_N$. For instance, $T_1$ can be Jun. 2, 2016, 8 pm EST, $T_2$ can be Jul. 2, 2016, 8 pm EST, . . . , and T N can be Nov. 2, 2016, 8 pm EST, where N=6.

Optionally, the second satellite can be the same as the first satellite. For instance, the first sensor can be a high-resolution sensor onboard the satellite 14A, and the second sensor can be a low-resolution sensor also onboard the satellite 14A. Optionally, the second satellite can be different from the first satellite. For instance, the first sensor can be a high-resolution sensor onboard the satellite 14A, and the second sensor can be a low-resolution sensor also onboard the satellite 14B. It's noted that satellite images with coarser resolution are more widely available than satellite images with finer resolution, and can be captured in a faster manner. As a result, using an additional satellite (i.e., the satellite 14B) to acquire the low-resolution satellite image time series 201-1B may help expedite the collection of training examples for the training dataset 201 than using a single satellite (i.e., satellite 14A) to both acquire the high-resolution satellite image 201-1A and the low-resolution satellite image time series 201-1B (though acquired via different sensors).

Optionally, the low-resolution satellite images forming the low-resolution satellite image time series 201-1B can be acquired by different satellites, or can be retrieved from different satellite databases, as long as these low-resolution satellite images are arranged in an ordered manner and have substantially the same or similar resolution.

As another non-limiting example, in some implementations, the high-resolution satellite image 201-1A (similarly, 201-nA) can be acquired by a first satellite for the particular region at time T, and the corresponding low-resolution satellite image time series 201-1B (similarly, 201-nB) can be acquired by processing a sequence of satellite images (each having a plurality of spectral bands or spectral channels) that are acquired by a second satellite, for the particular region, at consecutive times $T_1, T_2, \ldots, T_N$, respectively. For instance, the low-resolution satellite image time series 201-nB can be acquired by processing a respective satellite image of the sequence of satellite images to remove one or more spectra bands (e.g., atmospheric band(s)) from the plurality of spectral channels of the respective satellite image. The high-resolution satellite image 201-nA may or may not need to be processed to remove the one or more spectral bands. As another example, the low-resolution satellite image time series 201-nB can be acquired by processing a respective satellite image (that captures a plurality of parcels) to acquire a fragment of the respective satellite image that corresponds to a particular parcel, of the plurality of parcels, that is of interest. As a further example, the low-resolution satellite image time series 201-nB can be acquired by filtering satellite images acquired by satellite(s) to remove those displaying cloud cover or meteorological conditions.

As a further non-limiting example, in some implementations, a $n^{th}$ training example 201-n, of the plurality of training examples, can include: (1) a high-resolution image 201-nA capturing a particular region; and (2) a corresponding low-resolution satellite image time series 201-nB capturing the same particular region. In other words, instead of including a high-resolution satellite image captured by a satellite, the $n^{th}$ training example 201-n can include a high-resolution image acquired by an unmanned aerial vehicle ("UAV", a ground robot) or another device such as a street-view camera, for the particular region. In this case, the time the high-resolution image is acquired still needs to fall within the aforementioned $T_1$ and $T_N$.

After a sufficient number of training examples are collected as the aforementioned plurality of training examples (e.g., 201-2, . . . , 201-n) to form the training dataset 201, the plurality of training examples (e.g., 201-2, . . . , 201-n) can be applied to train a generative model 203 (e.g., an untrained generative model) until a predefined optimization goal is reached, to acquire a trained generative model 205. The trained generative model 205 can be configured to process a high-resolution image 206A acquired by a satellite (be it satellite 14A, satellite 14B, or other satellite) for a particular region, to generate a synthetic satellite image time series for the particular region.

For example, the generative model 205 may be trained using: (1) a first training example having the high-resolution satellite image 201-1A acquired for a first crop field at time $T_1$ and a corresponding low-resolution satellite image time series 201-1B acquired for the same first crop field at consecutive times $T_1+m, T_1+2\,m, \ldots, T_1+5\,m$; (2) a second training example having a high-resolution satellite image 201-2A acquired for a second crop field at time $T_2$ and a corresponding low-resolution satellite image time series 201-2B acquired for the same second crop field at consecutive times $T_2+m, T_2+2\,m, \ldots, T_2+5\,m$; . . . (n) a $q^{th}$ training example having a high-resolution satellite image 201-qA acquired for a $q^{th}$ crop field at time $T_q$ and a corresponding low-resolution satellite image time series 201-qB acquired for the same $q^{th}$ crop field at consecutive times $T_q+m, T_q+2\,m, \ldots, T_q+5\,m$. In this example, the trained generative model 205 can process a high resolution image captured by a satellite for a particular crop field at a particular time $T_p$, to generate a synthetic satellite image time series for the particular crop field corresponding to $T_p+m, T_p+2\,m, \ldots, T_p+5\,m$, where the synthetic satellite image time series here simulates real low-resolution satellite image time series (if there is any) captured by a satellite at $T_p+m, T_p+2\,m, \ldots, T_p+5\,m$.

As another example, the generative model 205 may be trained using: (1) a first training example having the high-resolution UAV image 201-1A acquired by a UAV for a grape field at time T' and a corresponding low-resolution satellite image time series 201-1B acquired for the same grape field at consecutive times T'+m, T'+2 m, . . . , T'+5 m (alternatively, $T'+m_1, T'+m_2, \ldots, T'+m_n$, where each two of $m_1, m_2, \ldots, m_n$ can be the same or different); (2) a second training example having a high-resolution UAV image 201-2A acquired by the UAV for a strawberry field at time T" and a corresponding low-resolution satellite image time series 201-2B acquired for the same crop field at consecutive times T"+m, T"+2 m, . . . , T"+5 m; . . . , (n) a $q^{th}$ training example having a high-resolution UAV image 201-qA acquired by the UAV for an apple field at time $T^q$ and a corresponding low-resolution satellite image time series 201-qB acquired for the same apple field at consecutive times $T^q+m, T^q+2\,m, \ldots, T^q+5\,m$. In this example, the trained generative model 205 can process a high resolution UAV image captured by the aforementioned UAV (or a different UAV) for a crop field at a particular time $T_p$, to generate a synthetic satellite image time series for the crop field corresponding to $T_p+m, T_p+2\,m, \ldots, T_p+5\,m$, where the synthetic satellite image time series here simulates real low-resolution satellite image time series (if there is any) captured by a satellite at $T_p+m, T_p+2\,m, \ldots, T_p+5\,m$.

Figure 2B:
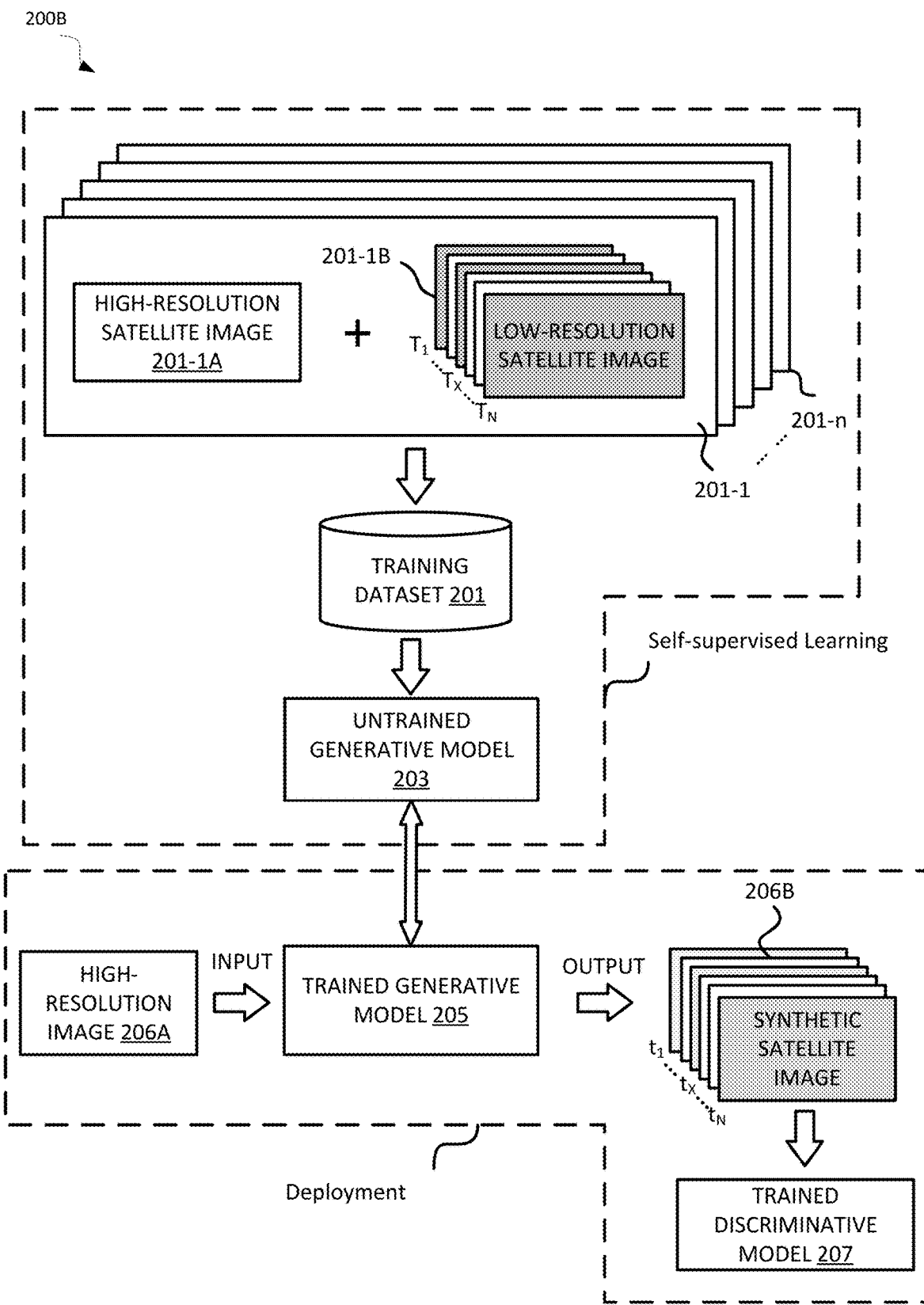
FIG. 2B illustrates another example of training and deployment of a generative model, for practicing certain aspects of the present disclosure, in accordance with various implementations.

FIG. 2B illustrates another example of training and deployment of a generative model, for practicing certain aspects of the present disclosure, in accordance with various implementations. As shown in FIG. 2B, collection of training examples and the training of the untrained generative model 203 using the collected training examples can be similar to that in FIG. 2A, and repeated descriptions are omitted herein.

Referring to FIG. 2B, and continuing with the aforementioned examples in which the trained generative model 205 is trained as described in FIG. 2A, the trained generative model 205 can process a high resolution image captured by a satellite for the crop field at a particular time $T_p$, to generate a synthetic satellite image time series for the crop field corresponding to $T_p+m, T_p+2\,m, \ldots, T_p+5\,m$. In this example, the synthetic satellite image time series 206B for the crop field can be processed using a trained model 207 for performing classification, segmentation, anomaly detection (e.g., a change in the land cover), prediction (e.g., a crop yield at $T_p+6\,m$), or other tasks.

Here, each synthetic image of the synthetic satellite image time series, when received by the trained model 207, can be in a first tensor format of C×H×W, where C is the number of spectral bands, H is the number of horizontal pixels, and W is the number of vertical pixels. Alternatively, the synthetic satellite image time series, when received by the trained model 207, can be in a second tensor format of C×T×H×W, where T is the number of temporal observations, C is the number of spectral bands, H is the number of horizontal pixels, and W is the number of vertical pixels. The trained model 207 can be a discriminative model that has been trained and validated to process time series, such as satellite image time series.

In some implementations, the trained model 207 can be a classifier (CNN-based, RNN-based, or a hybrid of CNN and RNN) trained to perform classification tasks by processing the aforementioned synthetic satellite image time series. Here, the trained classifier can include an input layer that receives the synthetic satellite image time series 206B, one or more layers of neurons that process the synthetic satellite image time series 206B to generate an overall embedding (noting that "embedding" of an image refers to a "representation vector" of the mage), and an output layer that processes the overall embedding to output a classification result. The classification result can indicate, or be used to determine, one or more object(s) in the synthetic satellite image time series.

Optionally, the trained classifier can include an input layer, one or more intermediate layers ("convolutional layers") of neurons, and an output layer. The input layer can receive the synthetic satellite image time series. The one or more intermediate layers can, for instance, include a convolution layer, a pooling layer, and a flattening layer. Such one or more intermediate layers can be configured to respectively extract spatial features (e.g., shape, textual, etc.) from each synthetic image (which may be viewed as a plurality of pixels), of the synthetic satellite image time series. As a non-limiting example, given the synthetic satellite image time series including image1, image2, and image3 (corresponding to t1, t2, and t3, respectively) that all capture the same field (e.g, crop field A), the one or more intermediate layers can be configured to generate a first embedding for image1 (corresponding to t1). Here, the first embedding, for instance, can be a vector including a plurality of pixel values, representing spatial features extracted from image1. Similarly, the one or more intermediate layers can be configured to generate a second embedding for image2 (corresponding to t2), where the second embedding represents spatial features extracted from image2, and the one or more intermediate layers can be configured to generate a third embedding for image3 (corresponding to t3), where the third embedding represents spatial features extracted from image3. Optionally, or additionally, the first embedding (e.g., E1), the second embedding (e.g., E2), and the third embedding (e.g., E3), can be concatenated to generate the overall embedding, e.g., E=(E1, E2, E3). The generated overall embedding can be fed to the output layer (e.g., a perception layer) to generate a classification result, where the classification result can indicate a type of the crop field A (e.g., a grape field). The output layer can, for instance, include only one neuron.

In some implementations, the trained model 207 can be a regressor (CNN-based, RNN-based, or a hybrid of CNN and RNN) trained to predict crop yield. For instance, the trained regressor can receive synthetic satellite image time series 206B in which a respective synthetic image depicts the same crop field at a respective time (e.g., month 1~month 6). The trained regressor can, for instance, process the synthetic satellite image time series 206B to predict one or more prediction results. Here, the one or more prediction results can be a crop yield predicted for month7. Alternatively, the one or more prediction results can include a crop yield predicted for month7 and a crop yield predicted for month8.

Figure 2C:
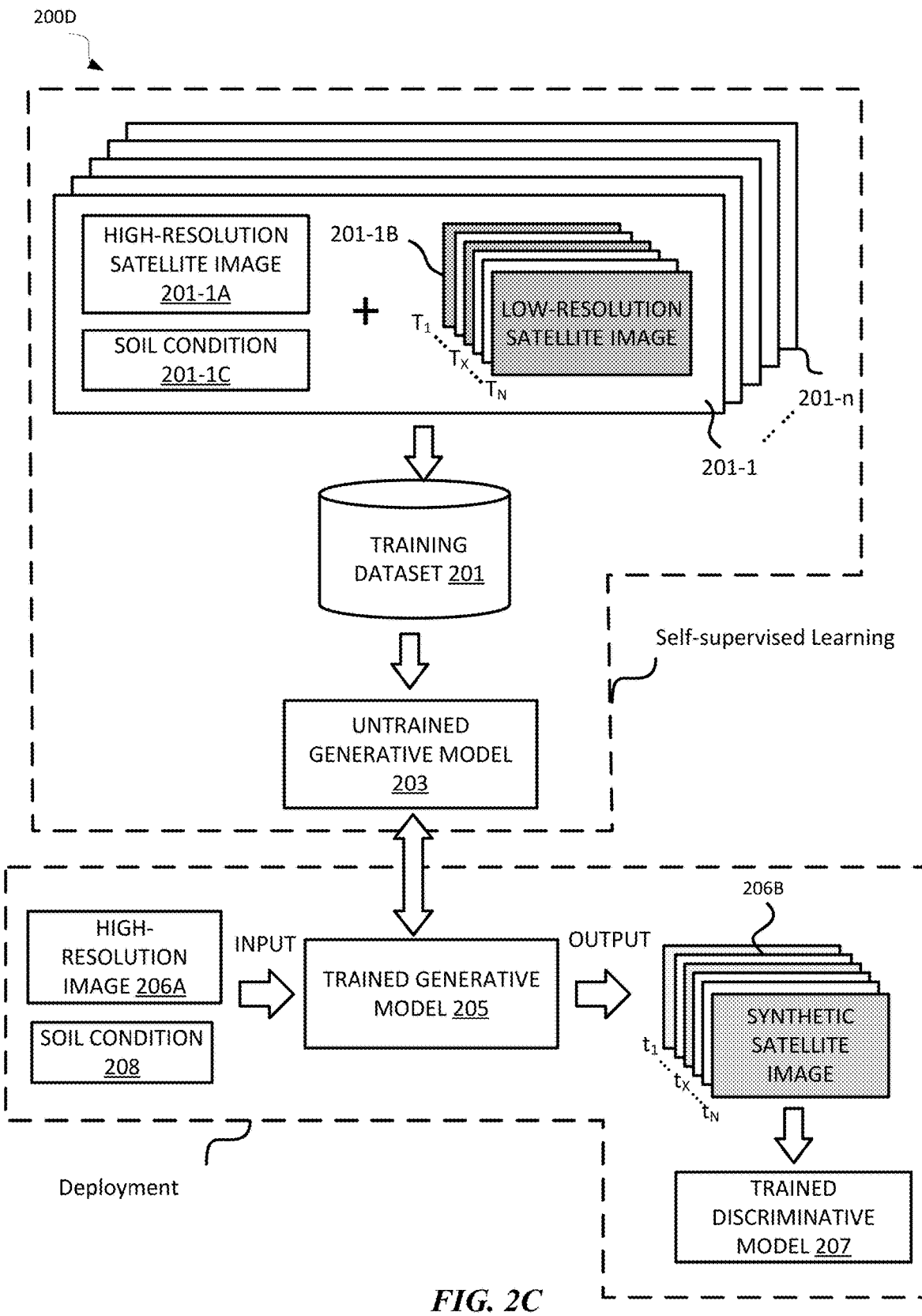
FIG. 2C illustrates a further example of training and deployment of a generative model, for practicing certain aspects of the present disclosure, in accordance with various implementations.

In various implementations, to further improve the accuracy of classification or regression, features such as, soil type, weather condition, fertilizer rate, may need to be considered because these features can be relevant to crop type or crop growth in a crop field, but are likely not revealed by satellite image(s) or a satellite image time series. FIG. 2C illustrates an additional example of training and deployment of a generative model, for practicing certain aspects of the present disclosure, in accordance with various implementations. Referring to FIG. 2C, an untrained generative model 203 can be trained using a plurality of training instances, where each of the plurality of training instances includes (a) a corresponding training example, of the aforementioned training examples and (b) soil condition 201-1C for the particular crop field. In other words, a nth training instance can be configured to include: (i) a high-resolution satellite image 201-1A acquired at time T, (ii) a corresponding low-resolution satellite image time series 201-1B acquired for the same crop field at consecutive times $T_1, \ldots, T_x, \ldots, T_N$, and (iii) soil condition of the same crop field at time T. It's noted that the soil condition may vary at different times (e.g., $T_1, \ldots, T_x, \ldots, T_N$). The untrained generative model 203 can be trained using the plurality of training instances (including the nth training instance) to generate the trained generative model 205. The trained generative model 205 can then be applied to receive and process a high-resolution image 206A for the crop field at T' and soil condition 208 of the crop field at T', to generate a synthetic satellite image time series $(T^1, T^2, \ldots, T'')$ for the crop field, where $T^1 < T' < T''$. Here, the generated synthetic satellite image time series $(T^1, T^2, \ldots, T'')$ for the crop field can be processed using any applicable trained discriminative model 207 as described above, and repeated descriptions are omitted herein.

Figure 2D:
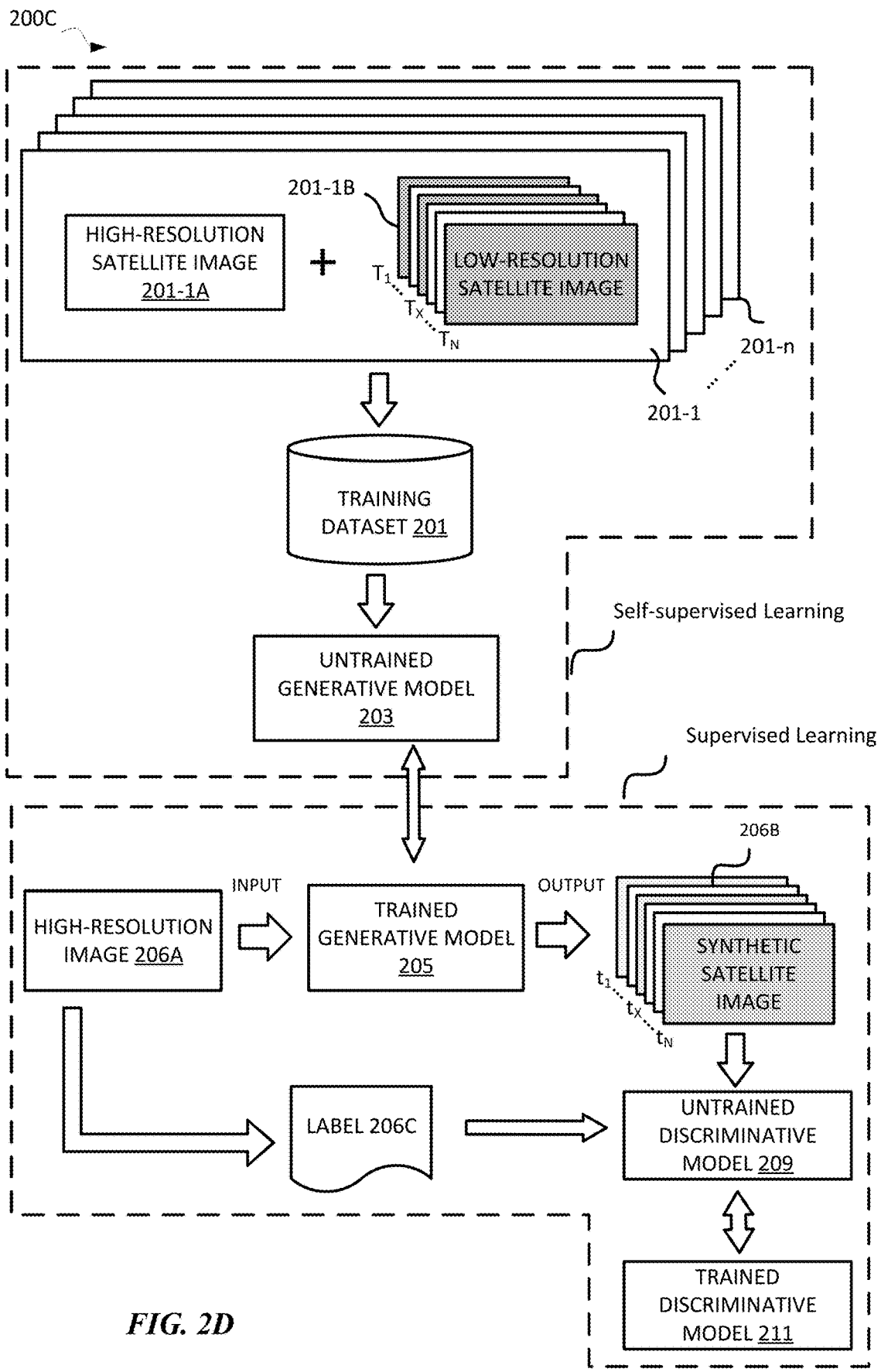
FIG. 2D illustrates an additional example of training and deployment of a generative model, for practicing certain aspects of the present disclosure, in accordance with various implementations.

In various implementations, FIG. 2D illustrates an additional example of training and deployment of a generative model, for practicing certain aspects of the present disclosure. Referring to FIG. 2D, instead of transmitting the generated synthetic satellite image time series 206B to the trained discriminative model 207 for acquiring a classification result or a prediction result, the generated synthetic satellite image time series 206B can be used to generate a training instance that further includes a corresponding label 206C. The generated synthetic satellite image time series can be processed using an untrained discriminative model 209 (or alternatively, a semi-trained discriminative model) as a training input, to train the untrained discriminative model 209. Here, the generated synthetic satellite image time series 206B is generated by processing the high-resolution image 206A using the trained generative model 205, and the label 206C (e.g., the actual annual crop yield for the crop field) is created from the high-resolution image 206A, where the label 206C can be applied as a ground-truth label for the generated synthetic satellite image time series 206B. The untrained discriminative model 209 can be trained using the generated synthetic satellite image time series 206B to generate an output (e.g., a predicted annual crop yield for the crop field), where the output can be compared with the ground-truth label 206C to determine a difference. Based on the determined difference, one or more weights of the untrained discriminative model 209 can be adjusted. The untrained discriminative model 209 can be iteratively trained in this way until a determined difference is within a predefined threshold, to acquire the trained discriminative model 211.

In various implementations, the trained discriminative model 211 can receive an additional high-resolution satellite image capturing the crop field to generate an output that indicates a characteristic (e.g., type, crop yield, etc.) of the crop field, where the characteristic predicted using the trained discriminative model 211 is of the same type as the characteristic included in the ground-truth label 206C.

Figure 3:
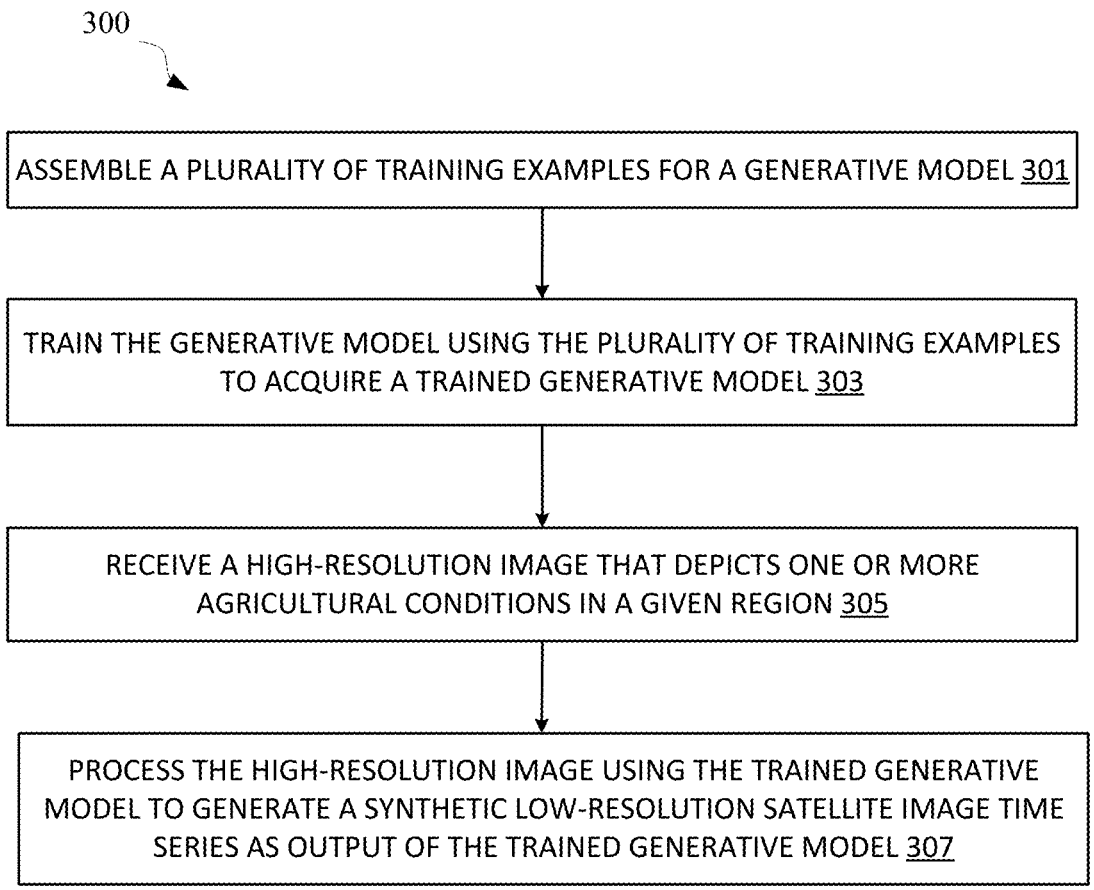
FIG. 3 illustrates an example method for training and deployment of a generative model, for practicing certain aspects of the present disclosure, in accordance with various implementations.

FIG. 3 illustrates an example method for training a generative model, for practicing certain aspects of the present disclosure, in accordance with various implementations. For convenience, the operations of the method 300 are described with reference to a system that performs the operations. The system of method 300 includes one or more processors and/or other component(s) of a client device and/or of a server device. Moreover, while operations of the method 300 are shown in a particular order, this is not meant to be limiting. One or more operations may be reordered, omitted, or added. As shown in FIG. 3, in various implementations, a method 300 of generating a synthetic satellite image time series can be performed by a system, where at block 301, the system assembles a plurality of training examples for a generative model. Here, each training example of the plurality of training examples includes: (1) a respective high-resolution image capturing a respective region at a particular time, and (2) a corresponding low-resolution satellite image time series capturing the same respective region.

In various implementations, the corresponding low-resolution satellite image time series capturing the first region are captured during a time interval that includes the particular time. In various implementations, the synthetic low-resolution satellite image time series has a substantially same image resolution as the corresponding low-resolution satellite image time series capturing the first region.

Optionally, the respective high-resolution image can be a respective high-resolution satellite image acquired via a high-resolution sensor of a first satellite, and the corresponding low-resolution satellite image time series can be acquired via a low-resolution sensor of a second satellite. The first satellite can be the same as, or different from, the second satellite.

Optionally, instead of a respective high-resolution satellite image, each training example of the plurality of training examples includes: (a) a respective high-resolution image capturing a respective region at a particular time, and (b) a corresponding low-resolution satellite image time series capturing the same respective region. In this case, the respective high-resolution image can be acquired via a sensor carried by an unmanned aerial vehicle ("UAV"), a street-view camera, a ground robot, or other devices.

Optionally, the respective high-resolution satellite image can be conditioned on other features, such as soil condition or weather condition.

In various implementations, at block 303, the system can train the generative model using the plurality of training examples to acquire a trained generative model. For instance, the system can train the generative model in a self-supervised manner (e.g., contrast learning) using the plurality of training examples, until a predefined optimization goal is reached (e.g., a correlation score between a high-resolution satellite image and the corresponding low-resolution satellite image time series satisfies a correlation threshold).

In various implementations, at block 305, the system can receive a high-resolution image, wherein the high-resolution image depicts one or more agricultural conditions in a given region.

In various implementations, at block 307, the system can process the high-resolution image using the trained generative model to generate a synthetic low-resolution satellite image time series as output of the trained generative model, wherein the synthetic low-resolution satellite image time series represent the one or more agricultural conditions.

Figure 4:
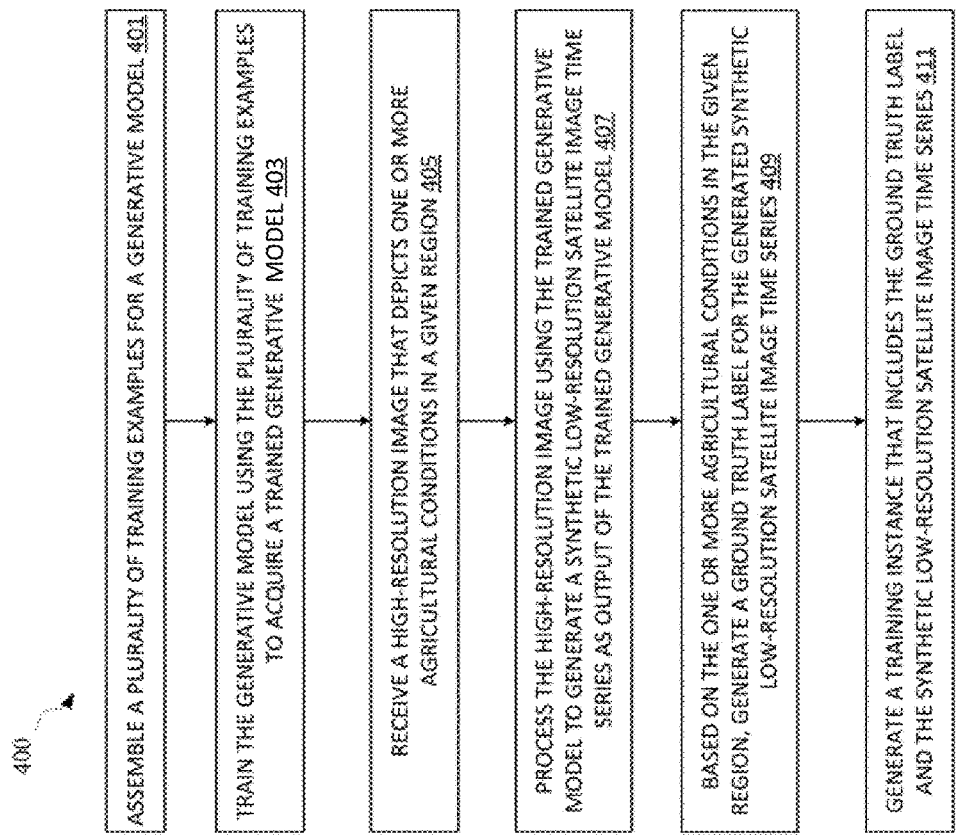
FIG. 4 illustrates an example method for training and deployment of a modeling system that includes a generative model and a discriminative model, for practicing certain aspects of the present disclosure, in accordance with various implementations.

FIG. 4 illustrates an example method for training and deployment of a modeling system that includes a generative model and a discriminative model, for practicing certain aspects of the present disclosure, in accordance with various implementations. For convenience, the operations of method 400 are described with reference to a system that performs the operations. The system of method 400 includes one or more processors and/or other component(s) of a client device and/or of a server device. Moreover, while operations of the method 400 are shown in a particular order, this is not meant to be limiting. One or more operations may be reordered, omitted, or added. As shown in FIG. 4, in various implementations, a method 400 of generating a synthetic satellite image time series can be performed by a modeling system, where at block 401, the modeling system assembles a plurality of training examples for a generative model. Here, each training example of the plurality of training examples includes: (1) a respective high-resolution image capturing a respective region at a particular time, and (2) a corresponding low-resolution satellite image time series capturing the same respective region. Descriptions of block 401 can be similar to that for block 301, and repeated descriptions are omitted herein.

In various implementations, at block 403, the modeling system can train the generative model using the plurality of training examples to acquire a trained generative model. In various implementations, at block 405, the modeling system can receive a high-resolution image, wherein the high-resolution image depicts one or more agricultural conditions in a given region. In various implementations, at block 407, the system can process the high-resolution image using the trained generative model to generate a synthetic low-resolution satellite image time series as output of the trained generative model, wherein the synthetic low-resolution satellite image time series represent the one or more agricultural conditions.

In various implementations, at block 409, the modeling system can, based on the one or more agricultural conditions in the given region, generate a ground truth label for the generated synthetic low-resolution satellite image time series. Based on the generated ground truth label characterizing a respective agricultural condition, of the one or more agricultural conditions in the given region, a training instance can be generated (block 411). Here, the training instance includes the generated synthetic low-resolution satellite image time series and the generated ground truth label. In various implementations, the modeling system can train an untrained or semi-trained discriminative model using the generated training instance.

In various implementation, the modeling system can train the discriminative model using the generated training instance by: processing the synthetic low-resolution satellite image time series, in the generated training instance, as input, using the discriminative model, to generate an output of the discriminative model; comparing the generated output with the ground truth label, in the generated training instance, to determine a difference between the generated output and the ground truth label; and updating one or more weights of the discriminative model based on the determined difference. The discriminative model can be trained repeatedly in this manner using one or more additionally generated training instances, until the determined difference is within a predetermined discriminative threshold.

Figure 5:
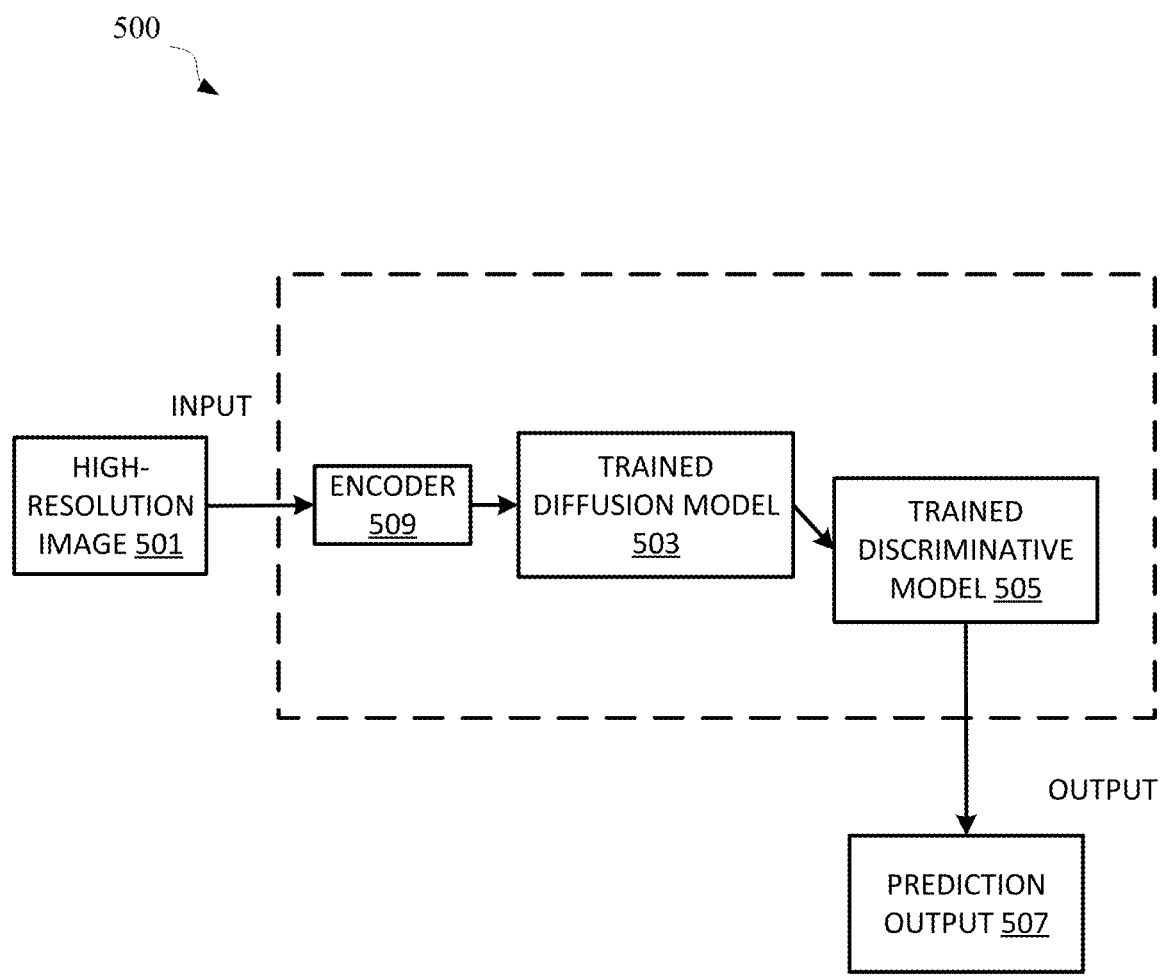
FIG. 5 illustrates an example system, for practicing certain aspects of the present disclosure, in accordance with various implementations.

FIG. 5 is a block diagram of an example system 500 that may optionally be utilized to perform one or more aspects of techniques described herein. As a non-limiting example, referring to FIG. 5, the example system 500 may include a trained diffusion model 503 and a trained discriminative model 505. The trained diffusion model 503 can be trained using the aforementioned training examples, where each training example includes a high-resolution satellite image and a corresponding low-resolution satellite image time series. The trained diffusion model 503 can be trained using these training examples via self-supervised contrastive learning, until the mutual information between a high-resolution satellite image and a corresponding low-resolution satellite image time series is maximized. After being trained, the trained diffusion model 503 can receive an embedding of a high-resolution image 501 generated by processing the high-resolution image 501 using a pre-trained encoder 509. The trained diffusion model 503 can add random noise to the embedding of the high-resolution image 501 during a forward diffusion stage and remove the random noise during a reverse diffusion stage, to generate a synthetic embedding (based on which, the aforementioned decoder can generate a synthetic low-resolution satellite image time series). However, instead of using the aforementioned decoder to process the synthetic embedding, the synthetic embedding can be processed using the trained discriminative model 505, to output a discriminative output, such as a predicted crop yield at a future month. The encoder 509, the trained diffusion model 503, and the trained discriminative model 505 may together form a prediction system that processes the high-resolution image 501, as input, to generate the prediction output 507.

Figure 6:
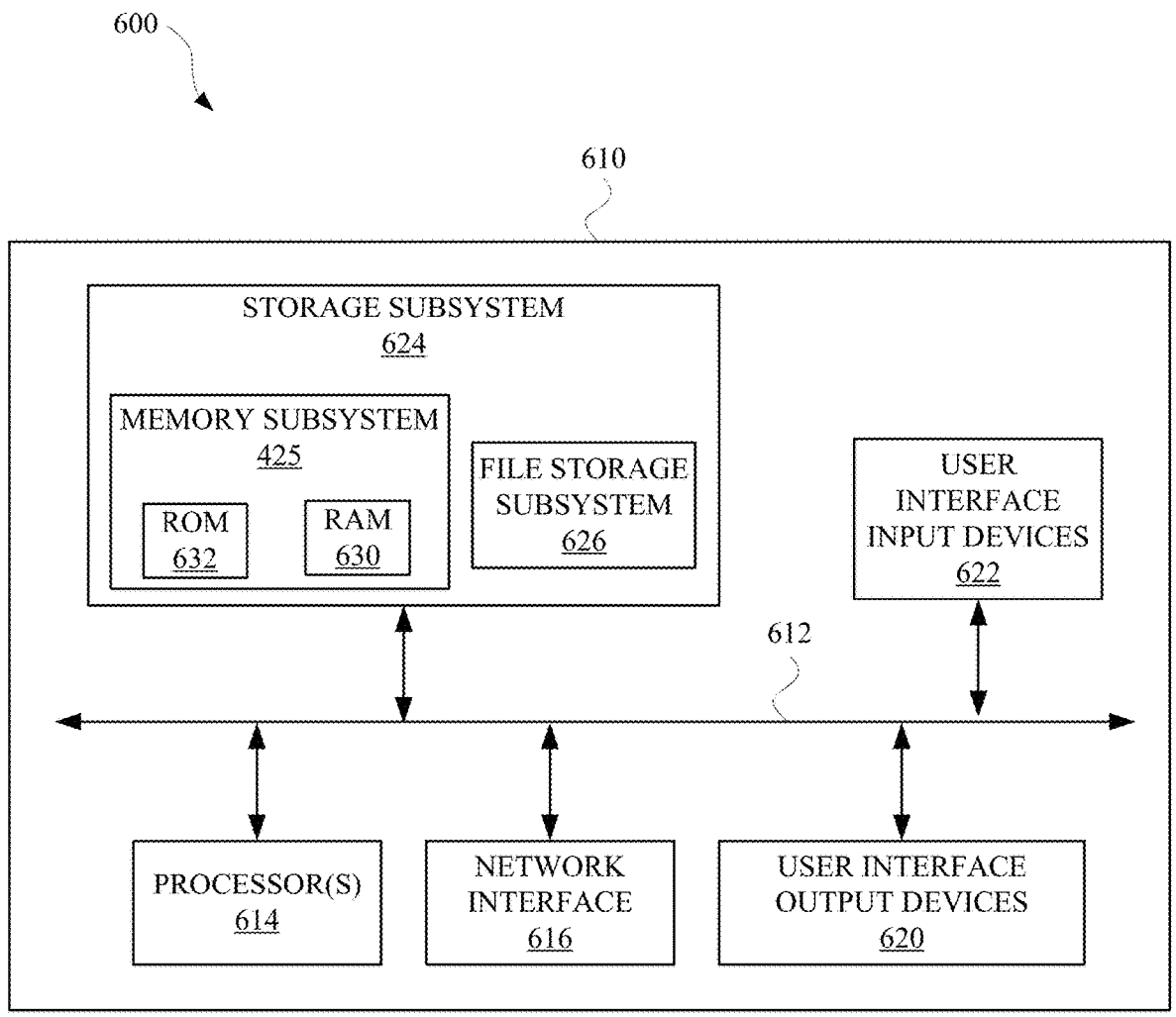
FIG. 6 illustrates an example architecture of a computing system, for practicing certain aspects of the present disclosure, in accordance with various implementations.

FIG. 6 is a block diagram of an example computing device 610 that may optionally be utilized to perform one or more aspects of techniques described herein. In some implementations, one or more of a client computing device, a cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, the method comprising:

receiving an image having a first resolution, wherein the image having the first resolution depicts one or more agricultural conditions in a given region; and processing the image having the first resolution using a trained generative model to generate a synthetic satellite image time series having a second resolution as an output of the trained generative model, the first resolution greater than the second resolution, and wherein the synthetic low resolution satellite image time series having the second resolution represent the one or more agricultural conditions, wherein the trained generative model is trained using a plurality of training examples, and wherein the plurality of training examples includes a first training example including (i) a respective satellite image having a third resolution capturing a respective region at a particular time and (ii) a corresponding satellite image time series having a fourth resolution capturing the respective region, the third resolution greater than the fourth resolution.

2. The method of claim 1, wherein the corresponding low-resolution satellite image time series having the fourth resolution capturing the respective region are captured during a time interval that includes the particular time.

3. The method of claim 1, wherein:

the respective satellite image having the third resolution is captured by a sensor having a fifth resolution of a first satellite, and the corresponding satellite image time series having the fourth resolution are captured by a sensor having a sixth resolution of a second satellite, wherein the fifth resolution is greater than the sixth resolution.

4. The method of claim 1, wherein the image having the first resolution is captured from a satellite, an unmanned aerial vehicle (UAV), or a ground-based vehicle.

5. The method of claim 1, further including processing the generated synthetic satellite image time series having the second resolution using a trained discriminative model to generate a prediction result or a classification result as an output of the trained discriminative model.

6. The method of claim 1, further including:

based on the one or more agricultural conditions in the given region, generating a ground truth label for the generated synthetic satellite image time series having the second resolution;

generating a training instance, wherein the generated training instance includes the generated synthetic satellite image time series having the second resolution and the generated ground truth label; and training a discriminative model using the generated training instance.

7. The method of claim 6, wherein the training the discriminative model using the generated training instance includes:

processing the generated synthetic satellite image time series having the second resolution using the discriminative model to generate an output of the discriminative model;

comparing the generated output with the ground truth label to determine a difference between the generated output and the ground truth label; and updating one or more weights of the discriminative model based on the determined difference.

8. The method of claim 1, wherein the first training example further includes metadata associated with the respective satellite image having the third resolution.

9. The method of claim 8, wherein the metadata associated with the respective satellite image having the third resolution is a soil condition, a terrain condition, or a weather condition at the particular time.

10. The method of claim 1, wherein the synthetic satellite image time series having the second resolution has a substantially same image resolution as the corresponding satellite image time series having the fourth resolution capturing the given region.

11. A system comprising one or more processors and a memory storing a plurality of instructions, wherein the plurality of instructions are executed to cause the one or more processors to:

receive an image having a first resolution, wherein the high-resolution image having the first resolution depicts one or more agricultural conditions in a given region; and process the image having the first resolution using a trained generative model to generate a synthetic satellite image time series having a second resolution as an output of the trained generative model, the first resolution greater than the second resolution, and the synthetic low-resolution satellite image time series having the second resolution represent the one or more agricultural conditions, wherein the trained generative model is trained using a plurality of training examples, and wherein the plurality of training examples includes a first training example including (i) a respective image having a third resolution capturing a respective region at a particular time and (ii) a corresponding satellite image time series having a fourth resolution capturing the respective region, the third resolution greater than the fourth resolution.

12. The system of claim 11, wherein the corresponding satellite image time series having the fourth resolution capturing the respective region are captured during a time interval that includes the particular time.

13. The system of claim 11, wherein:

the respective image having the third resolution is captured by a sensor having a fifth resolution of a first satellite, and the corresponding satellite image time series having the fourth resolution are captured by a sensor having a sixth resolution of a second satellite, wherein the fifth resolution is greater than the sixth resolution.

14. The system of claim 11, wherein the respective image having the third resolution is captured from an unmanned aerial vehicle (UAV) or a ground-based vehicle.

15. The system of claim 11, wherein the plurality of instructions are executed to further cause the one or more processors to process the generated synthetic satellite image time series having the second resolution using a trained discriminative model to generate a prediction result or a classification result as an output of the trained discriminative model.

16. The system of claim 11, wherein the plurality of instructions are executed to further cause the one or more processors to:

based on the one or more agricultural conditions in the given region, generate a ground truth label for the generated synthetic satellite image time series having the second resolution;

generate a training instance, wherein the generated training instance includes the generated synthetic satellite image time series having the second resolution and the generated ground truth label; and train a discriminative model using the generated training instance.

17. The system of claim 16, wherein the plurality of instructions are executed to further cause the one or more processors to train the discriminative model, wherein to train the discriminative model causes the one or more processors to:

process the generated synthetic satellite image time series having the second resolution using the discriminative model to generate an output of the discriminative model;

compare the generated output with the ground truth label to determine a difference between the generated output and the ground truth label; and update one or more weights of the discriminative model based on the determined difference.

18. The system of claim 11, wherein the first training example further includes metadata associated with the respective image having the third resolution.

19. The system of claim 18, wherein the metadata associated with the respective image having the third resolution is a soil condition or a weather condition at the particular time.

20. A method implemented using one or more processors, the method comprising:

receiving an image having a first resolution, wherein the image having the first resolution depicts one or more agricultural conditions in a given region; and in response to receiving the image having the first resolution:

generating a label associated with the given region in the image having the first resolution;

processing the image having the first resolution using a trained generative model to generate a synthetic satellite image time series having a second resolution as an output of the trained generative model, the first resolution greater than the second resolution, and the synthetic satellite image time series having the second resolution represent the one or more agricultural conditions, wherein the trained generative model is trained using a plurality of training examples, and the plurality of training examples includes a first training example including (i) a respective satellite image having a third resolution capturing a respective region and (ii) a corresponding satellite image time series having a fourth resolution capturing the respective region, the third resolution greater than the fourth resolution; and generating a training instance for an untrained discriminative model to include (1) the generated label, and (2) the generated synthetic satellite image time series having the second resolution.

* * * * *